United States Patent [19]

Godard et al.

[11] 4,227,152
[45] Oct. 7, 1980

[54] METHOD AND DEVICE FOR TRAINING AN ADAPTIVE EQUALIZER BY MEANS OF AN UNKNOWN DATA SIGNAL IN A QUADRATURE AMPLITUDE MODULATION TRANSMISSION SYSTEM

[75] Inventors: Dominique N. Godard, Le Rouret; Philippe E. Thirion, St-Paul-de-Vene, both of France

[73] Assignee: International Business Machines Corporation, Armonk, N.Y.

[21] Appl. No.: 41,585

[22] Filed: May 23, 1979

[30] Foreign Application Priority Data

Jun. 13, 1978 [FR] France .............................. 78 18478

[51] Int. Cl.³ ............................................. H04B 3/06
[52] U.S. Cl. ....................................... 375/13; 333/18; 375/14; 375/39
[58] Field of Search ........................ 325/323, 324, 42; 333/18; 178/67

[56] References Cited

U.S. PATENT DOCUMENTS 4,152,649  5/1979  Choquet .............................. 325/324

*Primary Examiner*—Harold I. Pitts
*Attorney, Agent, or Firm*—John B. Frisone

[57] ABSTRACT

A method and a device for training the equalizer of a receiver used in a QAM transmission system, by means of an unknown data signal, thereby enabling in particular said equalizer to be trained in the cases described above. In accordance with the method of the present invention, in a data receiver wherein, under normal operating conditions, the data is detected with respect to a first constellation, the equalizer is trained by detecting the data with respect to a second constellation which comprises fewer points than said first constellation and by adjusting the coefficients of the equalizer by means of an error signal produced as a result of the detection operation performed with respect to the second constellation.

In accordance with a first embodiment of the present invention, the second constellation is comprised of those points of the first constellation that are farthest from its center.

In accordance with a second embodiment of the invention, the points of the second constellation are obtained as follows: the first constellation is divided into L sets of points $S^l$, $l = 1, 2, \ldots, L$ and a point $b^l$ of the second constellation is associated with each set $S^l$ in accordance with the relation $$b^l = \frac{\sum_{k \in S^l} |a^k|^2}{\sum_{k \in S^l} |a^k|^*} \quad \text{for } l = 1, 2, \ldots, L$$

where the $a^k$'s are those points of the first constellation that belong to the set $S^l$.

10 Claims, 15 Drawing Figures

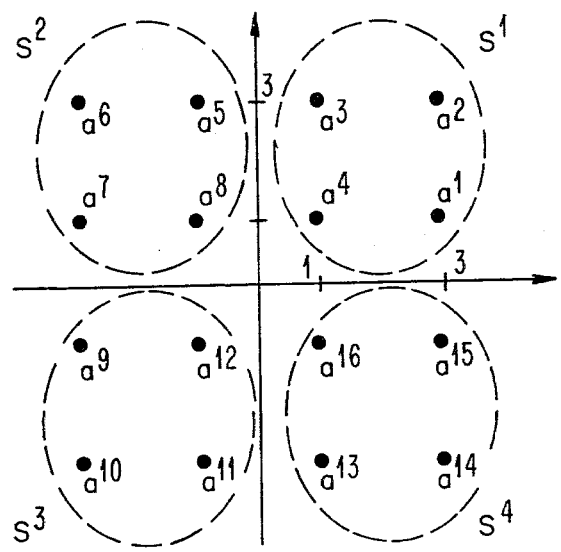
FIG. 4A
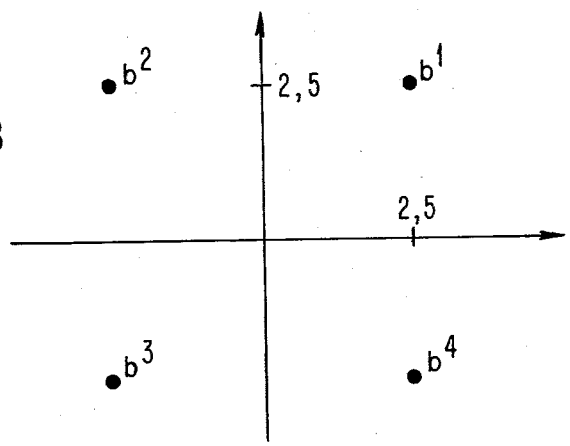
FIG. 4B
FIG. 6
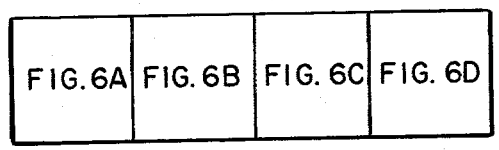

METHOD AND DEVICE FOR TRAINING AN ADAPTIVE EQUALIZER BY MEANS OF AN UNKNOWN DATA SIGNAL IN A QUADRATURE AMPLITUDE MODULATION TRANSMISSION SYSTEM

DESCRIPTION

1. Technical Field

This invention relates to automatic adaptive equalizers for use in data transmission systems employing a quadrature amplitude modulation (QAM) technique. The term QAM is used here in its broadest sense and includes all systems in which the transmitted signal is represented by superimposing two amplitude modulated quadrature carriers. Thus, the term QAM includes, in particular, amplitude phase-shift keying modulation as well as QAM in a narrow sense which involves independent modulation of the two quadrature carriers. More particularly, this invention relates to a method and a device for training an adaptive equalizer by means of an unknown data signal received by the receiver and is especially useful in those data transmission systems which are arranged in a multipoint network.

2. Background Art

In those data transmission systems which rely upon the QAM technique, the sequence of bits to be transmitted is first divided into groups of Q bits and each of these groups is made to correspond to one of $2^Q$ complex numbers, or complex symbols. The set of $2^Q$ symbols is usually represented on a complex plane by mapping thereon the points having these symbols as coordinates. In general, these points are collectively termed the signal constellation. The symbols are then transmitted one at a time at instants which have a regular T-second spacing and are called signaling instants. Each symbol is transmitted by causing an amplitude value of each of two quadrature carrier waves to correspond, respectively, to its real and imaginary parts. These two carriers are then combined and applied to the input of the transmission channel.

The function of the transmission channel is to provide at its output, which is connected to a data receiver, a signal relatively similar to the input signal applied thereto. Mainly due to cost considerations, telephone lines are frequently used as transmission channels. However, such lines, while satisfactory for voice transmission purposes, become inadequate when used to transmit digital data at speeds equal to or higher than 4800 bits per second with a very low probability of error. Telephone lines cause impairments which affect the quality of the signals being transmitted and make it difficult to correctly detect the transmitted data. These impairments mainly include amplitude and phase distortions that create an interaction between successive signals. This interaction is known as intersymbol interference. In high speed data transmission systems, the receiver is generally provided with an automatic adaptive equalizer to minimize the effects of the intersymbol interference prior to the data being detected.

The type of adaptive equalizer that is the most widely used in those data transmission systems which employ the QAM technique is the complex transversal equalizer, an exemplary embodiment of which is described in French Pat. No. 73 26404 (publication No. 2,237,379). In such an equalizer, each of the in-phase and quadrature components of the received signal is applied to the input of a pair of transversal filters whose outputs are then combined to generate the in-phase and quadrature components of the equalized signal. The coefficients of these filters, which are the coefficients of the equalizer, are automatically adjusted to meet a given performance criterion. Prior to any transmission of data, it is necessary that the values of the coefficients be as close as possible to optimum values. To this end, before transmitting any data, provision is made for a training period during which a known training sequence is transmitted and is then analyzed by the receiver which derives therefrom an initial adjustment of the coefficients of the equalizer to values that are as close as possible to the optimum values. The coefficients are thereafter continually adjusted during transmission of the data.

In those data transmission systems which are arranged in a multipoint network, several data terminals exchange data over a common transmission line. Each terminal is connected to the common line through a modem that includes a data transmitter and a data receiver. These terminals have varying degrees of intelligence, and in general one of them, often a computer, controls the entire network, with the transmission of data taking place between this computer and the other data terminals. Usually, the modem associated with the computer is referred to as the master modem and the other modems are called the slave modems. Generally, a network training procedure is carried out once a day before the first transmission of data takes place. During this procedure, the transmitter of the master modem provides synchronization signals over the common transmission line which are used to condition the receivers of the slave modems to receive the data to be subsequently transmitted. These synchronization signals include a known training sequence for training the equalizers of the slave modems. However, it may prove necessary in some cases to train the equalizer of the receiver of a slave modem after completion of the network training procedure. This may be the case, for example, if a slave modem happens to have the power off at the time the network training procedure is carried out and if it consequently fails to receive the training sequence, or if a slave modem, while conditioned by said procedure, subsequently loses equalization as a result of degradations of the transmission line characteristics.

Several methods of training the equalizer of a receiver in such cases have been proposed in the prior art.

In one of these methods, the transmitter of the master modem periodically transmits a training sequence to provide training of the equalizers of all slave modems. In another known method, any slave modem which has lost equalization alerts the master modem which responds by transmitting a training sequence for training the equalizer of thaat slave modem.

In both of these prior art methods, the receiver of the slave modem knows the transmitted training sequence and can fairly easily derive an initial adjustment of the equalizer from the received training sequence. However, in both methods, the operation of the entire network is adversely affected since no data transmission can take place while the training sequence is being transmitted.

In a third method proposed in the prior art, means are provided in each slave modem for storing several sets of coefficients of the equalizer which are then successively tested whenever a loss of equalization occurs. Of course, a limited number of such sets can be used, and it may not be possible to establish equalization if significant distortions are introduced by the transmission line.

SUMMARY OF THE INVENTION AND OBJECTS

Accordingly, it is an object of this invention to provide a method and a device for training the equalizer of a QAM data receiver which does not require the transmission of a training sequence known to the transmitter.

It is another object of this invention to provide a method and a device for training the equalizer of the QAM receiver of a slave modem used in a transmission network, without adversely affecting the operation of said network.

Generally, the invention contemplates a method and a device for training the equalizer of a receiver used in a QAM transmission system, by means of an unknown data signal, thereby enabling said equalizer to be trained in the cases described above. In accordance with the method of the present invention, in a data receiver wherein, under normal operating conditions, the data is detected with respect to a first constellation, the equalizer is trained by detecting the data with respect to a second constellation which comprises fewer points than said first constellation and by adjusting the coefficients of the equalizer by means of an error signal produced as a result of the detection operation performed with respect to the second constellation.

In accordance with a first embodiment of the present invention, the second constellation is comprised of those points of the first constellation that are farthest from its center.

In accordance with a second embodiment of the invention, the points of the second constellation are obtained as follows: the first constellation is divided into L sets of points $S^l$, $l=1, 2, \ldots, L$ and a point $l$ of the second constellation is associated with each set $S^l$ in accordance with the relation $$b^l = \frac{\sum\limits_{k \in S^l} |a^k|^2}{\left(\sum\limits_{k \in S^l} a^k\right)^*} \text{ for } l = 1, 2, \ldots, L$$

where the $a^k$'s are those points of the first constellation that belong to the set $S^l$.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 4A and 4B respectively illustrate a rectangular 16-point constellation and the corresponding reduced constellation obtained according to the second embodiment of the invention.

FIG. 6 and FIGS. 6A–6D together form a block diagram of a QAM receiver constructed in accordance with the invention.

DETAILED DESCRIPTION OF THE PREFERRED EMBODIMENTS

Figure 1:
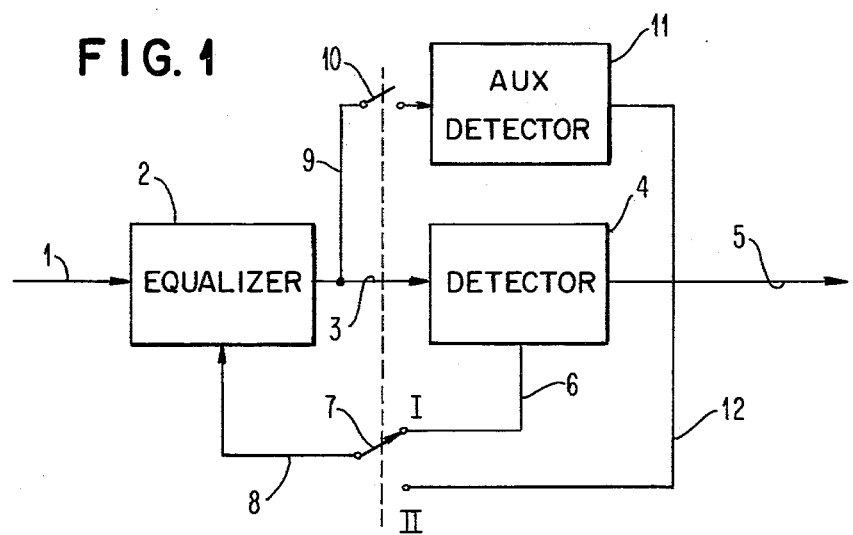
FIG. 1 is a simplified block diagram of a QAM receiver incorporating the invention.

In order that the invention may be more readily understood, a simplified diagram of a QAM receiver incorporating the invention has been shown in FIG. 1. A detailed description of this receiver will be provided later with reference to FIGS. 6A–6D.

The signal received from the transmission channel is sampled at the signaling rate 1/T and applied via line 1 to the input of an equalizer 2. The output of the equalizer 2 is connected via a line 3 to the input of a data detection device 4, a first output of which is connected to a line 5, on which the detected data is provided, and a second output of which is connected to a line 6. Line 6 is connected to position I of a two-position switch 7 whose common output is connected to the equalizer 2 via a line 8. The output of the equalizer 2 also is connected through a line 9 and a switch 10 to the input of an auxiliary data detection device 11 whose output is connected via a line 12 to position II of the switch 7.

It will be noted that the only difference between a conventional receiver and the one shown in the simplified diagram of FIG. 1 is that the latter includes the auxiliary data detection device 11 that is used to train the equalizer 2.

The operation of the receiver shown in FIG. 1 will now be described. In those digital data transmission systems which use the QAM technique, the data symbols are transmitted at the signaling rate 1/T and each of them can assume one of the K values $a^k$ ($k=1, 2, \ldots, K$) of a constellation referred to hereafter as constellation A. The symbol whose value is $a^k$, or symbol $a^k$, is transmitted by modulating the amplitude of an in-phase carrier $\cos \omega_c t$ ($\omega_c$ is the angular frequency of the carrier) by means of the real part of $a^k$, Re $a^k$, and by modulating the amplitude of a quadrature carrier $\sin \omega_c t$ by means of the imaginary part of $a^k$, Im $a^k$. The in-phase and quadrature carriers so modulated are then combined and sent over the transmission channel.

Figure 2A:
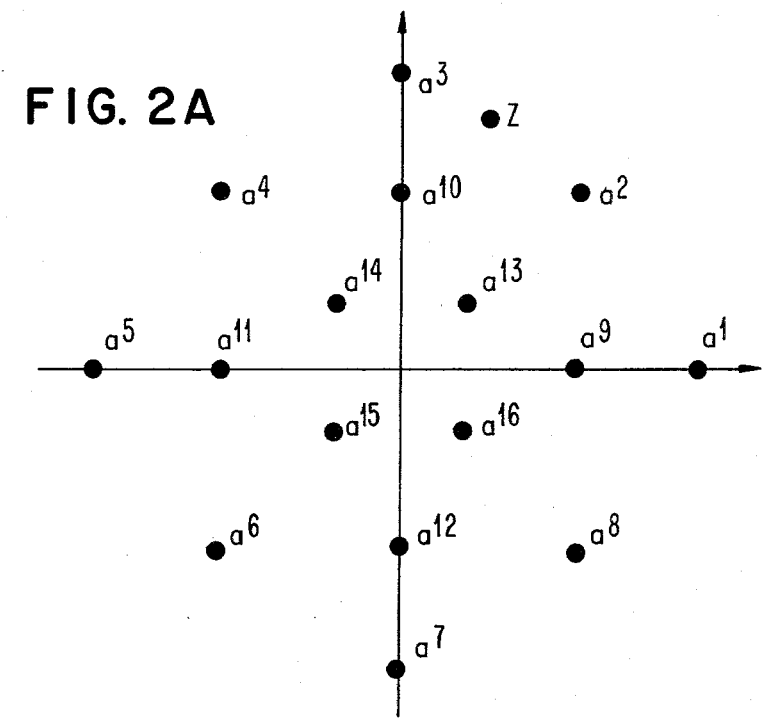
FIGS. 2A and 2B respectively illustrate a 4-phase, 4-amplitude, 16-point constellation and the corresponding reduced constellation that is obtained according to a first embodiment of the invention.

Still referring to FIG. 1, in the data mode of operation, the switch 10 is open and the switch 7 is set to position I, so that the data detection device 11 is disconnected from the receiver and the operation of the latter is similar to that of a conventional QAM receiver. The signal received from the transmission channel is equalized in the equalizer 2 and inputted via the line 3 to the data detection device 4 where it is compared with a first constellation which is in general identical to the constellation A used by the transmitter. It will be assumed, by way of example, that constellation A is the 16-point (K=16) constellation shown in FIG. 2A and known as a 4-phase, 4-amplitude constellation. It will further be assumed that the symbol transmitted at the $n^{th}$ sampling instant is the symbol $a^3$ and that the input signal applied to the device 4 is representative of the point Z shown in FIG. 2A. It will be noted that in an actual system point Z would not coincide with the point representative of symbol $a^3$ because of the impairments introduced by the transmission channel. The data detection device 4 compares point Z with the points of constellation A, decides on the basis of predetermined criteria that (for example) symbol $a^3$ has been transmitted, and provides the value of this symbol on line 5. In addition, the data detection device 4 supplies a first error signal which is usually a function of the distance between point Z and the point representative of the selected symbol, $a^3$. This first error signal is applied via line 6, switch 7 (set to position I) and line 8 to the equalizer 2 which derives therefrom control signals for adjusting its coefficients.

In the data mode of operation, the coefficients of the equalizer are properly adjusted during the training period to values that are as close as possible to the optimum values, very few detection errors are made by the data detection device 4, and the error signal provided by that device assures the convergence, that is, the correct operation of the equalizer.

If the coefficients of the equalizer have not been properly adjusted prior to the transmission of data, either because the receiver failed to make use of the training period or because equalization was lost, as explained earlier, then a large number of detection errors will occur and the error signal supplied by the data detection device 4 will no longer assure the convergence of the equalizer. It will then become necessary to train the equalizer.

According to the method of the present invention, the equalizer is trained by performing a detection operation with respect to a second constellation referred to hereafter as constellation B, which comprises fewer points than the constellation A used by the data detection device 4. Still referring to FIG. 1, in the training mode of operation, the switch 10 is closed and the switch 7 is set to position II. The input signal to the device 4 also is applied to the auxiliary data detection device 11 where it is compared with the points of constellation B. Device 11 selects that point of constellation B which is nearest point Z and provides an error signal which usually is dependent upon the distance between point Z and the point so selected. This second error signal is fed via the line 12 to the equalizer 2 which derives therefrom the control signals required to adjust its coefficients.

According to a first embodiment of the invention, constellation B is comprised of those points of constellation A which are farthest from its center. Assume that constellation A is that shown in FIG. 2A. This is the 16-point, 4-phase, 4-amplitude constellation prescribed by CCITT Recommendation V29. In accordance with the invention, we shall select as constellation B the constellation illustrated in FIG. 2B which only comprises the four points of constellation A, namely $a^1$, $a^3$, $a^5$ and $a^7$, which are farthest from its center. When using the constellation B obtained in accordance with the first embodiment of the invention, it is desirable not to adjust the coefficients of the equalizer where the point representative of the input signal to the auxiliary detection device 11 lies within a central area that includes those points of constellation A which do not pertain to constellation B.

Figure 2B:
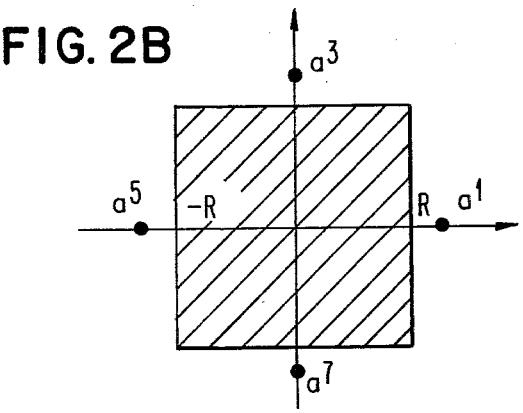

Referring now to FIG. 2B, a square central area that comprises all points of the constellation, except $a^1$, $a^3$, $a^5$ and $a^7$, is shown. This square area has the same center as the constellation and the length of each of its sides is equal to 2R. If the input signal is designated z and if the in-phase and quadrature components of z are respectively designated $z_i$ and $z_q$, then the coefficients of the equalizer shall only be adjusted if $$|z_i| > R \text{ and}$$

and $$|z_q| > R$$

In accordance with another embodiment of the invention, constellation B is obtained as follows. Let $a^i$, $i=1, 2, \ldots, I$, be the various points of constellation A, and $b^l$, $l=1, 2, \ldots, L$, the various points of constellation B. Constellation A is divided into L sets of points, $S^l$, $l=1, 2, \ldots, L$, and one of the points $b^l$ of constellation B is caused to correspond to each set $S^l$.

The relationship between the points $b^l$ of constellation B and those points $a^k$ of constellation A which pertain to the set $S^l$ is given as:

$$b^l = \frac{\sum\limits_{k \in S^l} |a^k|^2}{\left(\sum\limits_{k \in S^l} a^k\right)^*} \quad l = 1, 2, \ldots, L. \tag{1}$$

(* indicates the conjugate complex quantity, and $\epsilon$ means "belongs to").

Relation (1) is obtained as follows. The adjustment of the coefficients of the equalizer in accordance with the well-known gradient method is defined by the following known relation in vector notation:

$$\underline{C}^{n+1} = \underline{C}^n - \mu e_n \underline{Y}_n^* \tag{2}$$

where
$\underline{C}^{n+1}$ is the vector of the values of the coefficients of the equalizer at the $(n+1)^{th}$ iteration,
$\underline{C}^n$ is the same vector at the $n^{th}$ iteration,
$\underline{Y}_n$ is the vector of the signals stored in the equalizer at signaling instant nT,
$\mu$ is a constant, and
$e_n$ is an error signal at the signaling instant nT.

In order to train the equalizer in accordance with the present invention, the error signal $e_n$ is produced by performing a detection operation with respect to constellation B, and one may write:

$$e_n = z_n - b_n \tag{3}$$

where
$z_n$ is the output signal provided by the equalizer at the signaling instant nT, and
$b_n$ is that point of constellation B which is detected by the auxiliary data detection device.
The equalizer has converged when the mathematical expectation of the increments of the coefficients for all possible data sequences is nil, that is, if $$E(e_n \underline{Y}_n^*) = 0 \tag{4}$$

or, according to (3), if $$E(z_n - b_n) \underline{Y}_n^* = 0 \tag{5}$$

It will now be assumed that the coefficients of the equalizer have reached their optimum values; neglecting the noise, the output signal supplied by the equalizer will then be given by:

$$z_n = a_n \quad (6)$$

where $a_n$ is the constellation A symbol transmitted at the signaling instant nT.

Each element of vector $\underline{Y}_n^*$ can be expressed as $$y_k = \sum_p a_{k-p} x_p \quad (7)$$

where the $x_p$'s are the samples of the received signal element.

Substituting (6) and (7) into (5), and assuming that the data symbols being transmitted are not correlated, one obtains:

$$\sum_{k \in S^l} (a^k - b^l)^* a^k = 0 \quad (8)$$

Relation (8) can be written $$b^l = \frac{\sum_{k \in S^l} |a^k|^2}{\sum_{k \in S^l} a^{k*}} \quad \text{for } l = 1, 2, \text{lll}, L.$$

The above relation is relation (1) given earlier.

Some exemplary constellations B determined in accordance with the second embodiment of the invention will now be given.

EXAMPLE 1

Figure 3A:
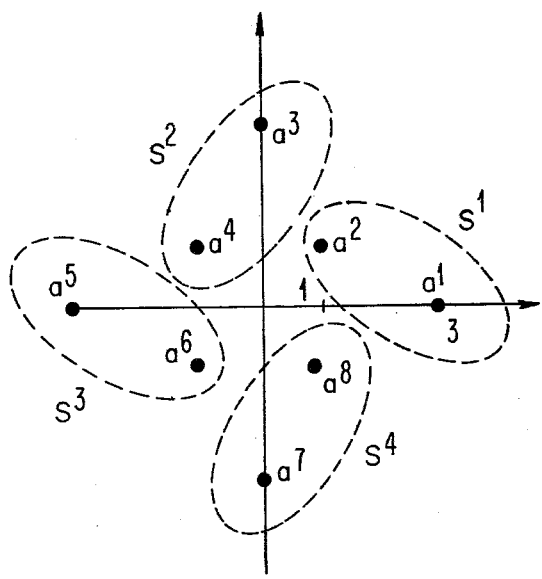
FIGS. 3A and 3B respectively illustrate a 4-phase, 2-amplitude, 8-point constellation and the corresponding reduced constellation obtained according to a second embodiment of the invention.

Let constellation A be as shown in FIG. 3A. This constellation comprises eight points, $a^1$–$a^8$, whose coordinates are as follows:

| | | | |
|---|---|---|---|
| $a^1$ (3,0); | $a^2$ (1,1); | $a^3$ (0,3); | $a^4$ (−1,1) |
| $a^5$ (−3,0); | $a^6$ (−1,−1); | $a^7$ (0,−3); | $a^8$ (1,−1). |

Points $a^1$–$a^8$ can be represented by the complex numbers

| | | | |
|---|---|---|---|
| $a^1 = 3$ | $a^2 = 1 + j$ | $a^3 = 3j$ | $a^4 = -1 + j$ |
| $a^5 = -3$ | $a^6 = -1 - j$ | $a^7 = -3j$ | $a^8 = 1 - j$ | where $j = \sqrt{-1}$

One divides the constellation into four sets of two points each as follows:

| | | | |
|---|---|---|---|
| $S^1(a^1,a^2)$ | $S^2(a^3,a^4)$ | $S^3(a^5,a^6)$ | $S^4(a^7,a^8)$ |

The constellation B that corresponds to this constellation A will be comprised of four points, $b^1$–$b^4$, respectively associated with the four sets $S^1$–$S^4$.

According to relation (1), one has $$b^1 = \frac{|a^1|^2 + |a^2|^2}{(a^1 + a^2)^*} = \frac{9 + 2}{(4 + j)^*} = \frac{11}{4 - j}$$
$$= 11 \frac{(4 + j)}{(4 - j)(4 + j)} = \frac{11}{17}(4 + j)$$
$$= 2.5882 + 0.647 j.$$

$$b^2 = \frac{|a^3|^2 + |a^4|^2}{(a^3 + a^4)^*}$$
$$= -0.647 + 2.5882 j$$

$$b^3 = \frac{|a^5|^2 + |a^6|^2}{(a^5 + a^6)^*}$$
$$= -2.5882 - 0.647 j$$

$$b^4 = \frac{|a^7|^2 + |a^8|^2}{(a^7 + a^8)^*}$$
$$= 0.647 - 2.5882 j$$

Figure 3B:
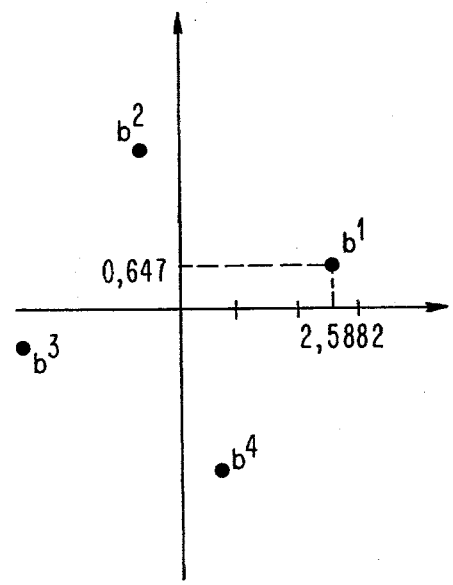

The constellation B comprised of the four points, $b^1$–$b^4$, determined as above is shown in FIG. 3B.

EXAMPLE 2

Let constellation A be the 16-state constellation shown in FIG. 4A. This constellation comprises sixteen points, $a^1$–$a^{16}$, whose coordinates are as follows:

| | | | |
|---|---|---|---|
| $a^1$(3,1) | $a^2$(3,3) | $a^3$(1,3) | $a^4$(1,1) |
| $a^5$(−1,3) | $a^6$(−3,3) | $a^7$(−3,1) | $a^8$(−1,1) |
| $a^9$(−3,−1) | $a^{10}$(−3,−3) | $a^{11}$(−1,−3) | $a^{12}$(−1,−1) |
| $a^{13}$(1,−3) | $a^{14}$(3,−3) | $a^{15}$(3,−1) | $a^{16}$(1,−1) |

One divides the constellation A shown in FIG. 4A into four sets of four points each:

| | |
|---|---|
| $S^1(a^1,a^2,a^3,a^4)$; | $S^2(a^5,a^6,a^7,a^8)$ |
| $S^3(a^9,a^{10},a^{11},a^{12})$; | $S^4(a^{13},a^{14},a^{15},a^{16})$. |

The corresponding constellation B comprises four points, $b^1$–$b^4$, respectively associated with sets $S^1$–$S^4$.

According to relation (1), one has $$b^1 = \frac{|a^1|^2 + |a^2|^2 + |a^3|^2 + |a^4|^2}{(a^1 + a^2 + a^3 + a^4)^*}$$
$$= \frac{40}{(8 + 8j)^*} = \frac{5}{(1 + j)^*} = \frac{5}{1 - j}$$
$$= \frac{5(1 + j)}{(1 - j)(1 + j)} = 2.5(1 + j)$$

Similarly, one gets $$b^2 = 2.5(-1 + j)$$

$$b^3 = 2.5(-1 - j)$$

$$b^4 = 2.5(1 - j)$$

The constellation B comprised of these four points, $b^1$–$b^4$, is shown in FIG. 4B.

EXAMPLE 3

Figure 5A:
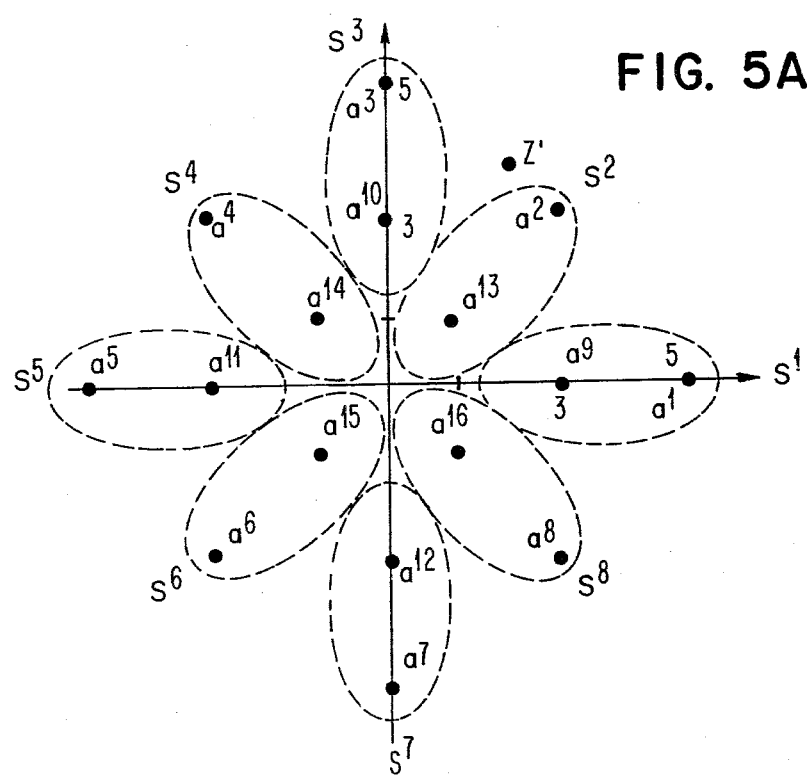
FIGS. 5A and 5B respectively illustrate the constellation of FIG. 2A and the corresponding reduced constellation obtained in accordance with a second embodiment of the invention.

Let constellation A be the 16-state, 4-phase, 4-amplitude constellation prescribed by CCITT Recommendation V29 and shown in FIG. 5A. The respective coordinates of the sixteen points, $a^1$–$a^{16}$, are as follows:

| | | | |
|---|---|---|---|
| $a^1$(5,0) | $a^2$(3,3) | $a^3$(0,5) | $a^4$(−3,3) |
| $a^5$(−5,0) | $a^6$(−3,−3) | $a^7$(0,−5) | $a^8$(3,−3) |
| $a^9$(3,0) | $a^{10}$(0,3) | $a^{11}$(−3,0) | $a^{12}$(0,−3) |
| $a^{13}$(1,1) | $a^{14}$(−1,1) | $a^{15}$(−1,−1) | $a^{16}$(1,−1) |

One divides this constellation into eight sets of two points each:

| | | | |
|---|---|---|---|
| $S^1(a^1,a^9)$ | $S^2(a^2,a^{13})$; | $S^3(a^3,a^{10})$; | $S^4(a^4,a^{14})$ |
| $S^5(a^5,a^{11})$; | $S^6(a^6,a^{15})$; | $S^7(a^7,a^{12})$; | $S^8(a^8,a^{16})$ |

The corresponding constellation B will be comprised of eight points, $b^1-b^8$, respectively associated with sets $S^1-S^8$.

According to (1), one has $$b^1 = \frac{|a^1|^2 + |a^9|^2}{(a^1 + a^9)^*} = \frac{25 + 9}{8} = 4.25$$

$$b^2 = \frac{|a^2|^2 + |a^{13}|^2}{(a^2 + a^{13})^*} = \frac{18 + 2}{(4 + 4j)^*} = \frac{20}{4(1-j)}$$

$$= \frac{20}{4} \cdot \frac{1+j}{(1-j)(1+j)} = \frac{20}{4} \cdot \frac{1+j}{2}$$

$$= \frac{20}{8}(1+j) = 2.5(1+j)$$

Figure 5B:
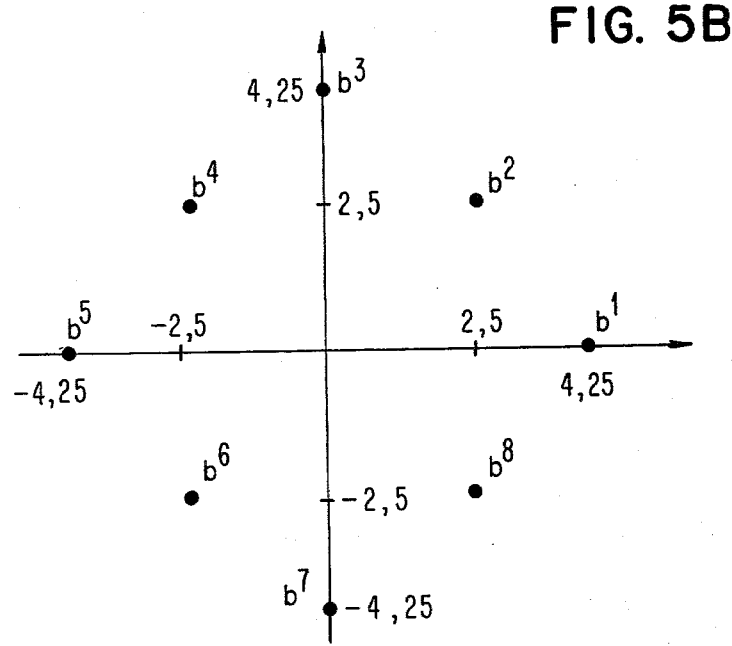

Similarly, one finds $b^3 = 4.25j$ $b^4 = 2.5(-1+j)$ $b^5 = -4.25$ $b^6 = 2.5(-1-j)$ $b^7 = -4.25j$ $b^8 = 2.5(1-j)$ The constellation B comprised of these eight points, $b^1-b^8$, is shown in FIG. 5B.

Figure 6A:
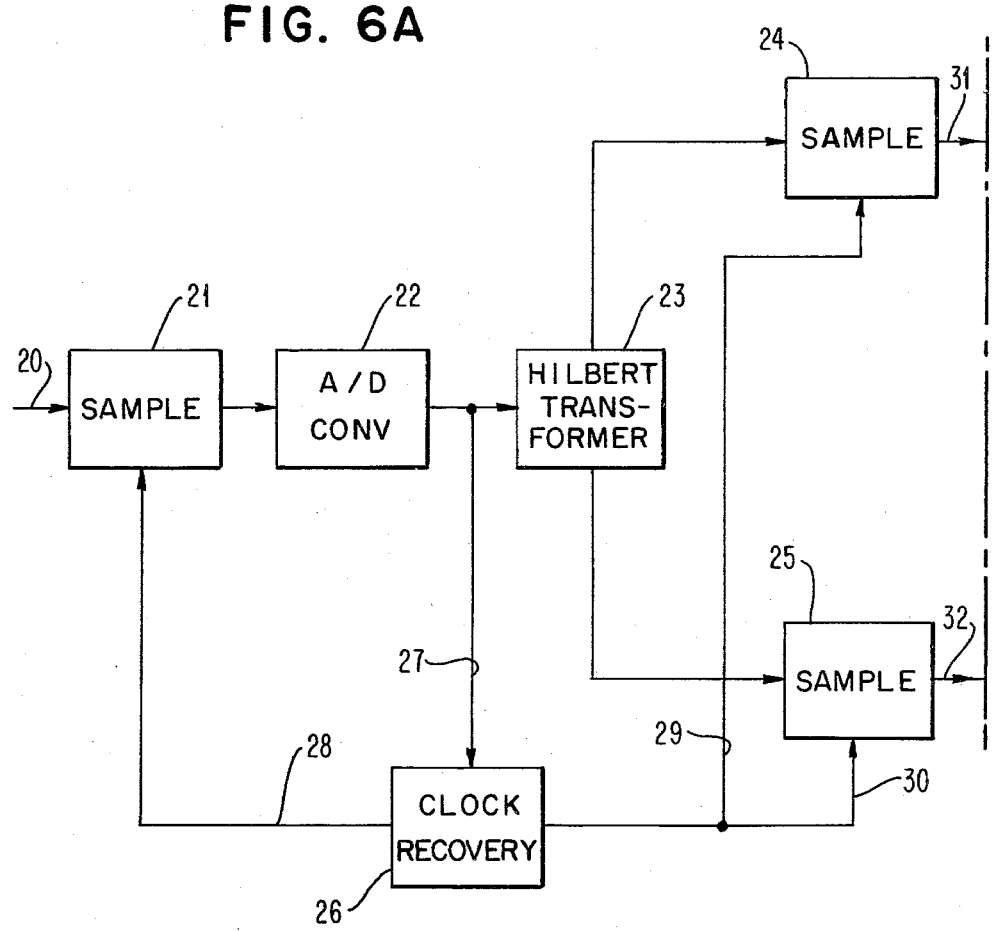

Referring now to FIG. 6, which consists of FIGS. 6A–6D, a detailed block diagram of a 9600 bps QAM receiver in accordance with CCITT Recommendation V29 and incorporating the invention is shown. Referring to FIG. 6A, the signal received from the transmission channel and the energy of which has been normalized by an automatic gain control circuit (not shown), is applied by a line 20, after being passed through a bandpass filter (not shown) which rejects the out-of-band noise, to a sampling device 21 in which it is sampled at the rate $1/\tau$. The selected rate $1/\tau$ is equal to a multiple m/T of the signaling frequency 1/T so as to provide a sufficient number of samples at the output of the device 21 to enable the received signal to be suitably defined. The value of the amplitude of these samples is converted to digital form in an analog-to-digital converter 22 and inputted to a digital Hilbert transformer 23.

Figure 6B:
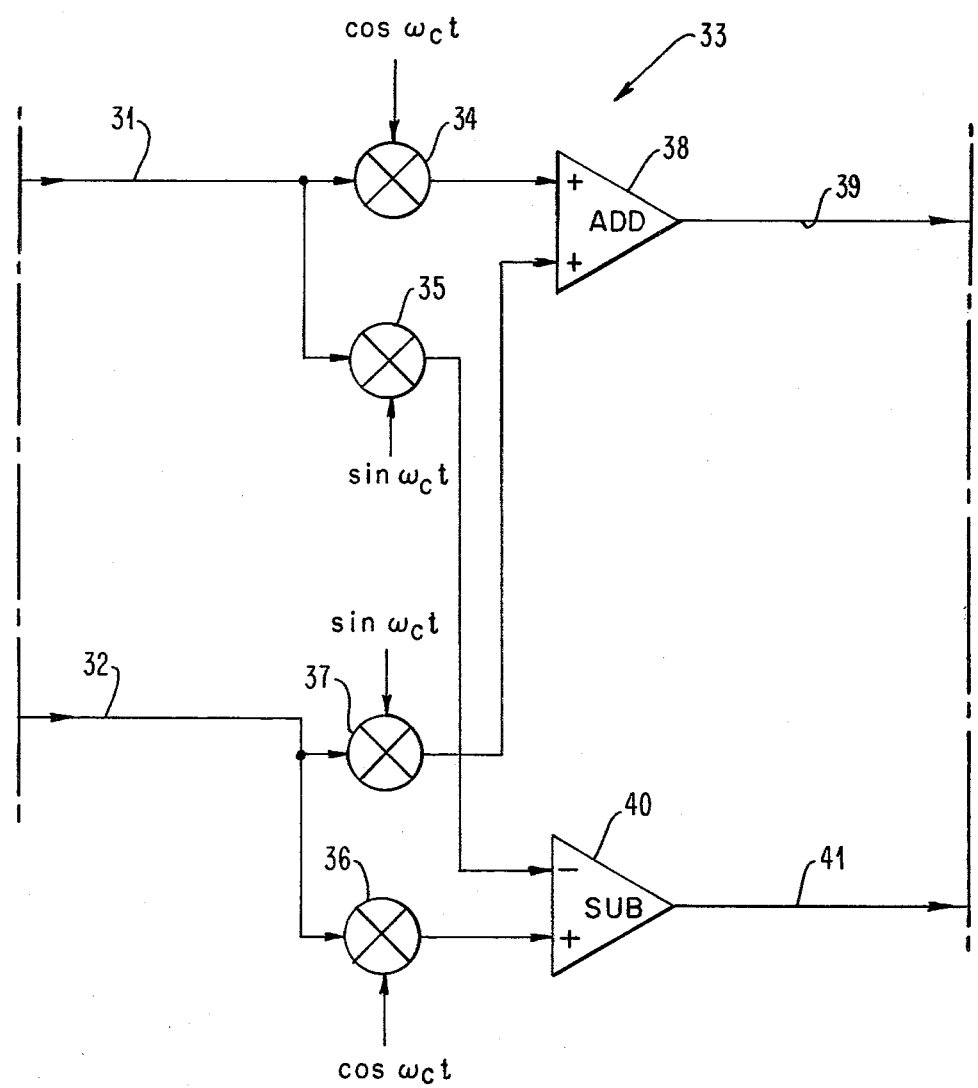

A Hilbert transformer is a two-output device which supplies the in-phase and quadrature components of an input signal applied thereto. An exemplary digital embodiment of such a device is described in an article entitled "Theory and Implementation of the Discrete Hilbert Transform," by L. R. Robiner and C. M. Rader, in *Digital Signal Processing*, IEEE Press, 1972. The in-phase and quadrature components of the input signal applied to the Hilbert transformer 23 are respectively resampled at the signaling rate 1/T by two sampling devices 24 and 25. A clock recovery device 26 has its input connected via a line 27 to the output of the analog-to-digital converter 22 and controls sampling devices 21, 24 and 25 via lines 28, 29 and 30 and all other components of the receiver via lines not shown. An example of such a clock recovery device is described in French Pat. No. 75 14020 filed by the present applicant Apr. 25, 1975 (publication No. 2,309,089). The in-phase and quadrature components respectively provided on the output lines 31 and 32 from sampling devices 24 and 25 ae demodulated in a demodulator 33 (FIG. 6B). Conventionally, the demodulator 33 includes two multipliers 34 and 35, each of which has a first input connected to the line 31, and two multipliers 36 and 37, each of which has a first input connected to the line 32. The second input of each of multipliers 34 and 36 receives an in-phase carrier, $\cos \omega_c t$, while the second input of each of multipliers 35 and 37 receives a quadrature carrier, $\sin \omega_c t$. The in-phase and quadrature carriers are supplied by a local source (not shown).

The output from the multiplier 37 is added to that from the multiplier 34 in a binary adder 38 which has its output connected to a line 39. The output from the multiplier 35 is subtracted from that from the multiplier 36 in a binary subtractor 40, the output of which is connected to a line 41. Thus, the in-phase and quadrature components of the demodulated signal are respectively provided on lines 39 and 41.

If the signal received at the signal instant nT is designated $r_n$, the in-phase and quadrature components thereof respectively available on lines 31 and 32 can be expressed as $r_{i,n}$ and $r_{q,n}$, respectively. It can be verified that the in-phase and quadrature components, $y_{i,n}$ and $y_{q,n}$, respectively, of the demodulated signal, $y_n$, are obtained on lines 39 and 41 in accordance with the following known relations:

$$y_{i,n} = r_{i,n} \cos \omega_c t + r_{q,n} \sin \omega_c t \quad (9)$$

$$y_{q,n} = -r_{i,n} \sin \omega_c t + r_{q,n} \cos \omega_c t \quad (10)$$

Figure 6C:
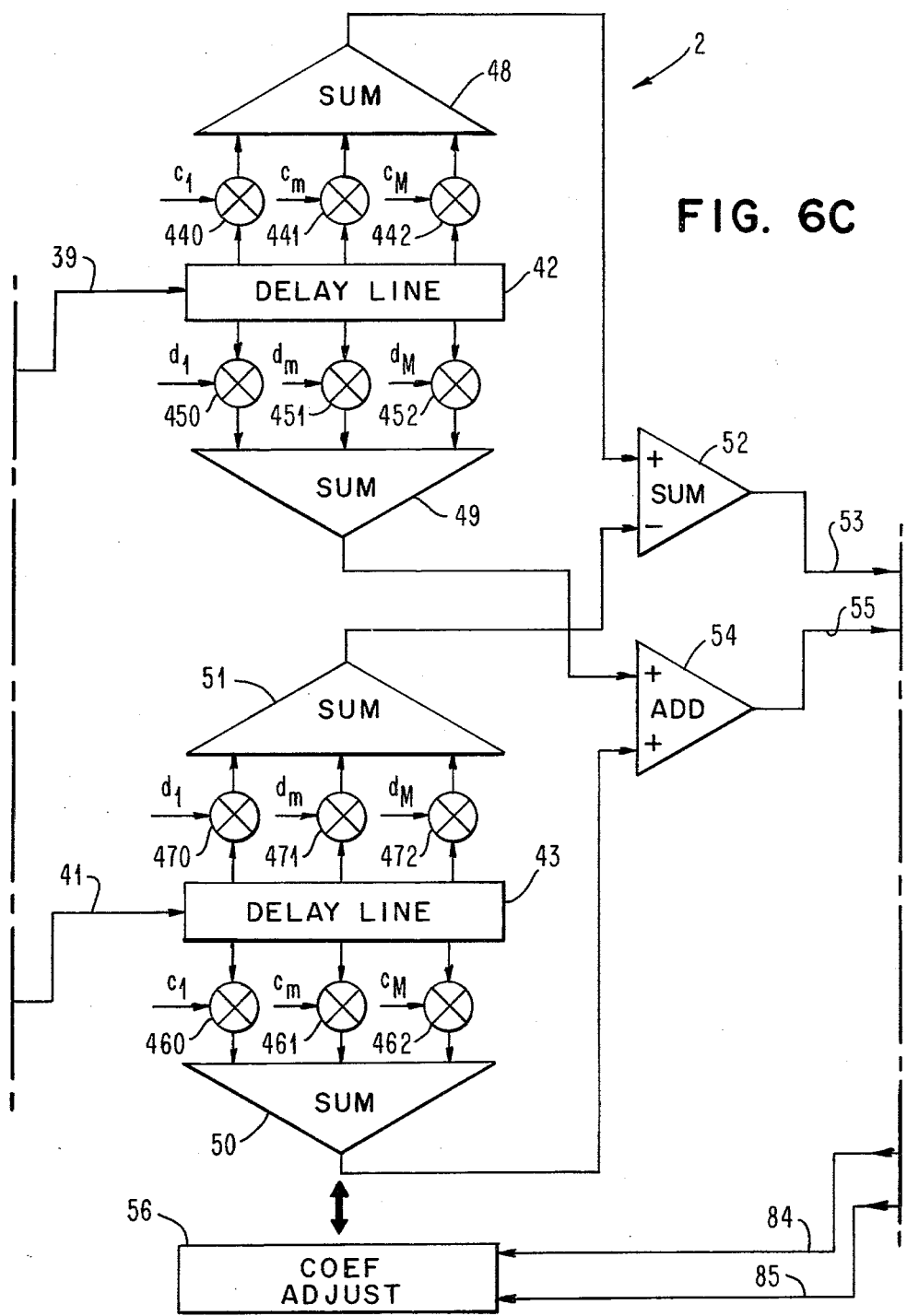

The in-phase and quadrature components of the demodulated signal are inputted via lines 39 and 41 to an adaptive complex transversal equalizer 2 (FIG. 6C). A detailed description of such an equalizer is provided in French Pat. No. 73 26404 filed by the present applicatn July 12, 1973 (publication No. 2,237,379).

The equalized signal, designated $z_n$ hereafter, supplied by the equalizer at the signaling instant nT is conventionally expressed as $$z_n = \sum_{m=1}^{M} y_{n-m} C_m \quad (11)$$

where

M is the number of taps of the equalizer, $C_m$ represents the coefficients of the equalizer, and $y_{n-m}$ is the demodulated signal present at the $m^{th}$ tap.

In the particular case of a QAM receiver, $z_n$, $y_{n-m}$ and $C_m$ are complex quantities:

$z_n = a_{i,n} + jz_{q,n}$ $y_{n-m} = y_{i,n-m} + jy_{q,n-m}$ $C_m = c_m + jd_m$ and relation (11) can be written $$z_{i,n} = \sum_{m=1}^{M} y_{i,n-m} c_m - \sum_{m=1}^{M} y_{q,n-m} d_m \quad (12)$$

$$z_{q,n} = \sum_{m=1}^{M} y_{i,n-m} d_m + \sum_{m=1}^{M} y_{q,n-m} c_m \quad (13)$$

The equalizer 2 shown in FIG. 6C uses relations (12) and (13) and includes two M-tap delay lines 42 and 43 in which the in-phase and quadrature components of the demodulated signal are respectively stored. The delay between two adjacent taps is equal to the signaling period T. The taps of the delay line 42 are respectively connected to a first input of M multipliers 440, ..., 441, ..., 442 and to a first input of M multipliers 450, ..., 451, ..., 452. The second inputs of multipliers 440, ..., 441, ..., 442 receive coefficients $c_1, \ldots, c_m, \ldots, c_M$, respectively, while the second inputs of multipliers 450, ..., 451, ..., 452 receive coefficients $d_1, \ldots, d_m, \ldots, d_M$, respectively. The taps of the delay line 43 are respectively connected to a first input of M multipliers 460, ..., 461, ..., 462, and to a first input of M multipliers 470, ..., 471, ..., 472. The second inputs of multipliers 460, ..., 461, ..., 462 receive coefficients $c_1, \ldots, c_m, \ldots, c_M$ while the second inputs of multipliers 470, ..., 471, ..., 472 receive coefficients $d_1, \ldots, d_m, \ldots, d_M$, respectively. The outputs from multipliers 440, ..., 442 are summed in a summing device 48. The outputs from multipliers 450, ..., 452 are summed in a summing device 49. The outputs from multipliers 460, ..., 462 and 470, ..., 471 are respectively summed in summing devices 50 and 51. The output from the summing device 51 is subtracted from the output from the summing device 48 in a subtractor 52 which has its output connected to a line 53. The outputs from summing devices 49 and 50 are added up in an adder 54 whose output is connected to a line 55. It can be verified that the components $z_{i,n}$ and $z_{q,n}$ are respectively obtained on lines 53 and 55 in accordance with relations (12) and (13). The coefficients of the equalizer are adjusted by a coefficient adjustment device 56 to be described later with reference to FIG. 7.

The components $z_{i,n}$ and $z_{q,n}$ of the equalized signal are respectively inputted via lines 53 and 55 to a data detection system 57 (FIG. 6D), a detailed description of which is provided in French Pat. No. 74 43560 filed by the present applicant Dec. 27, 1974 (publication No. 2,296,322). In system 57, components $z_{i,n}$ and $z_{q,n}$ are inputted to a phase rotation device 58 which causes the phase of the equalized signal to rotate by an angle equal to $-\Delta\tilde{\phi}_n$, with $\Delta\tilde{\phi}_n$ being an estimated value of the phase error. Those skilled in the art will readily understand that the device 58 is a means of subtracting the value $\Delta\tilde{\phi}_n$ from the phase of signal $z_n$. The components of the equalized signal after the phase thereof has been caused to rotate will be written $z_{i,n}'$ and $z_{q,n}'$, respectively. The phase rotation device 58 can be implemented by means of an arrangement relying upon the known relations:

$$z_{i,n}' = z_{i,n} \cos \Delta\tilde{\phi}_n + z_{q,n} \sin \Delta\tilde{\phi}_n \tag{14}$$

$$z_{q,n}' = -z_{i,n} \sin \Delta\tilde{\phi}_n + z_{q,n} \cos \Delta\tilde{\phi}_n \tag{15}$$

The device 58 receives the quantities $\cos \Delta\tilde{\phi}_n$ and $\sin \Delta\tilde{\phi}_n$ via lines 61 and 62, respectively. The components $z_{i,n}'$ and $z_{q,n}'$ are inputted via lines 59 and 60 to a data detection device 4 comprising a decision logic 63 and a read-only memory (ROM) 64. Said components are applied via lines 59 and 60 to the inputs of the decision logic 63, which also receives two inputs from the ROM 64 and supplies on lines 65 and 66, respectively, the in-phase and quadrature components of the detected data symbol and applies the components of a first error signal to a first conversion device 69 via lines 67 and 68. The device 69 further receives components $z_{i,n}'$ and $z_{q,n}'$ via lines 70, 71, and the components of the detected data symbol via lines 72, 73. The device 69 supplies the value of the residual phase error which is applied via a line 74 to a predictive phase filter 75. The filter 75 supplies the estimated phase error $\Delta\tilde{\phi}_n$ to a second conversion device 76, which has its outputs connected to lines 61 and 62 and provides thereon the trigonometric functions $\cos \Delta\tilde{\phi}_n$ and $\sin \Delta\tilde{\phi}_n$. Lines 67 and 68 are respectively connected via lines 77 and 78 to position I of each of a pair of two position switches 79 and 80 whose common outputs are respectively connected via lines 81 and 82 to the inputs of a second phase rotation device 83. The device 83 also receives the quantities $\cos \Delta\tilde{\phi}_n$ and $\sin \Delta\tilde{\phi}_n$ via lines 61 and 62 and has its two outputs connected via lines 84 and 85 to the coefficient adjustment device 56 (FIG. 6C).

The components $z_{i,n}'$ and $z_{q,n}'$ supplied by the phase rotation device 58 are respectively applied via two lines 86 and 87 and two switches 88 and 89 to the inputs of an auxiliary data detection device 11 which includes a decision logic 90 and a read-only memory (ROM) 91. The decision logic 90 has two inputs respectively connected to lines 86 and 87 by switches 88 and 89 and two other inputs connected to the ROM 91. The decision logic 90 has two outputs respectively connected via lines 92 and 93 to position II of switches 79 and 80.

In the data mode of operation, switches 88 and 89 are both open, switches 79 and 80 are both set to position I, and the auxiliary data detection device 11 is disconnected from the data detection system 57 whose operation is identical to that of the data detection system described in detail in the aforementioned French Pat. No. 74 43560. Briefly, components $z_{i,n}$ and $z_{q,n}$ of the equalized signal are applied to the phase rotation device 58 which causes the phase of the equalized signal to rotate by an angle equal to $-\Delta\tilde{\phi}_n$. Components $z_{i,n}'$ and $z_{q,n}'$ of the output signal, which are the components of the input signal to the data detection device 4, are then fed to the decision logic 63. The signal whose components are $z_{i,n}'$ and $z_{q,n}'$ will be referred to as the input signal hereafter. The input signal can be represented by a point Z' in the constellation A of FIG. 5A. The coordinates of point Z' are $z_{i,n}'$ and $z_{q,n}'$. The function of the detection device 4 is to compare point Z' with all of the points, $a^1-a^{16}$, of constellation A and to select the point nearest Z'. In the example illustrated in FIG. 5A, this is point $a^2$. The decision logic 63 selects point $a^2$ by calculating the distances between point Z' and points $a^1-a^{16}$ and by selecting the shortest of these distances. To this end, the logic 63 receives the coordinates, stored in the ROM 64, of points $a^1-a^{16}$. An example of such a decision logic is given in the aforementioned French Pat. No. 74 43560. After selecting the point $a^2$, the logic 63 supplies on lines 65 and 66 the coordinates of this point which are representative of the data and calculates the components, which shall be written $\Delta_a z_{i,n}'$ and $\Delta_a a_{q,n}'$, of a first error signal, $\epsilon_n$, according to the following relations:

$$\Delta_a z_{i,n}' = z_{i,n}' - a_i^2 \tag{16}$$

$$\Delta_a z_{q,n} = z_{q,n}' - a_q^2 \tag{17}$$

where $a_i^2$ and $a_q^2$ represent the coordinates of point $a^2$.

The components $\Delta_a z_{i,n}'$ and $\Delta_a z_{q,n}'$ of the error signal $\epsilon_n$, the components $z_{i,n}'$ and $z_{q,n}'$ of the input signal, and the components $a_i^2$ and $a_q^2$ of the selected point of constellation A are applied to the conversation device 69 via lines 67, 68, 70, 71, 72 and 73, respectively. The conversion device 69 supplies on line 74 a residual phase error $\delta\phi_n$ which is equal to the difference between the phase of the input signal and the phase of the selected point $a^2$. Device 69 calculates the phase error $\delta\phi_n$ in accordance with the relation $$\delta\phi_n = \frac{z'_{i,n}\Delta_a z'_{q,n} - z'_{q,n}\Delta_a z'_{i,n}}{a_i^2 z'_{i,n} + a_q^2 z'_{q,n}} \quad (18)$$

For more details, reference should be made to French Pat. No. 74 43560 mentioned above. The residual phase error $\delta\phi_n$ is inputted via line 74 to the predictive phase filter 75 which provides an estimated phase error value derived from pervious residual phase errors. Such a predictive filter is described in detail in French Pat. No. 74 30001 filed by the present applicant Aug. 30, 1974 (publication no. 2,283.606) and in the aforementioned French Pat. No. 74 43560, both of which should be consulted. The estimated phase error value $\delta\tilde{\phi}_n$ supplied by the filter 75 is applied to the conversion device 76 which converts that value to $\cos\Delta\tilde{\phi}_n$ and $\sin\Delta\tilde{\phi}_n$. Conventionally, the device 76 consists of a ROM in which the values of $\cos\Delta\tilde{\phi}_n$ and $\sin\Delta\tilde{\phi}_n$ are stored at the address corresponding to the value of $\Delta\tilde{\phi}_n$. The values of $\cos\Delta\tilde{\phi}_n$ and $\sin\Delta\tilde{\phi}_n$ supplied by the device 76 are fed via lines 61 and 62 to phase rotation devices 58 and 83.

In operation, the signals that control the coefficients of the equalizer 2 are derived from the error signal $\epsilon_n$ supplied by the decision logic 63. However, to allow for the fact that the equalizer is loaded with signals $z_n$ and that the error signal $\epsilon_n$ is obtained from the input signals $z_n'$, whose phase differs from that of signals $z_n$ in that the value $\Delta\tilde{\phi}_n$ has been subtracted therefrom, the value $\Delta\tilde{\phi}_n$ is now added to the phase of the error signal $\epsilon_n$ before it is applied to the adjustment device 56.

Referring again to FIG. 6D, the components $\Delta_a z_{i,n}'$ and $\Delta_a z_{q,n}'$ supplied by the decision logic 63 are also applied, respectively, via lines 77 and 78, switches 79 and 80, both of which are set to position I, and lines 81 and 82, to the inputs of the phase rotation device 83, which also receives the values of $\cos\Delta\tilde{\phi}_n$ and $\sin\Delta\tilde{\phi}_n$ via lines 61 and 62. The device 83 is similar to the device 58 and causes the phase of the signal whose components are $\Delta_a z_{i,n}'$ and $\Delta_a z_{q,n}'$ to rotate by an angle equal to $\Delta\tilde{\phi}_n$. Those skilled in the art will appreciate that the device 83 is a means of adding $\Delta\tilde{\phi}_n$ to the phase of the error signal $\epsilon_n$. The signal so obtained after its phase has been rotated is used as the error signal $e_n$ for the purpose of adjusting the coefficients of the equalizer. The device 83 provides on lines 84 and 85, respectively, the in-phase and quadrature components, written $e_{i,n}$ and $e_{q,n}$ of the error signal $e_n$. These components are fed via lines 84 and 85 to the coefficient adjustment device 56 (FIG. 6C), which derives therefrom the control signals used to adjust the coefficients of the equalizer. Device 56 will be described later with reference to FIG. 7.

In the training mode of operation, switches 88 and 89 are both closed and switches 79 and 80 are both set to position II, so that the auxiliary data detection device 11 is turned on and the data detection device 4 is disconnected from lines 81 and 82. The device 4 operates as in the data mode, except that it no longer feeds the coefficient adjustment device 56. Note that the device 4 still feeds the phase filter 75 as well as phase rotation devices 58 and 83. The components $z_{i,n}'$ and $z_{q,n}'$ supplied by the device 58, of the input signal are respectively applied, via lines 86 and 87 and switches 88 and 89, both of which are closed, to the inputs of the decision logic 90, which is similar to the decision logic 63. The function of the logic 90 is to compare point $Z'$ will all of the points, $b^1-b^8$, of constellation B, to select the point nearest $Z'$, for example point $b^2$ (FIG. 5B), and to provide an error signal, written $e_n'$, representative of the error between point $Z'$ and the selected point of constellation B. To this end, the decision logic 90 receives from the ROM 91 the coordinates of points $b^1-b^8$ of constellation B, calculates the distances between point $Z'$ and these points, selects the point nearest $Z'$, for example, point $b^2$, and calculates the components, written $\Delta_b z_{i,n}'$ and $\Delta_b z_{q,n}'$, of the error signal $e_n'$ in accordance with the relations $$\Delta_b z_{i,n}' = z_{i,n}' - b_i^2$$

$$\Delta_b z_{q,n}' = z_{q,n}' - b_q^2$$

where
$b_i^2$ and $b_q^2$ are the coordinates of point $b^2$ in the complex plane.

In the training mode of operation, the signals that control the coefficients of the equalizer 2 are derived from the error signal $e_n'$ supplied by the auxiliary data detection device 11. However, in the exemplary embodiment shown in FIG. 6D, $\Delta\tilde{\phi}_n$ is added, as mentioned earlier, to the phase of the error signal $e_n'$ before it is applied to the adjustment device 56.

Figure 6D:
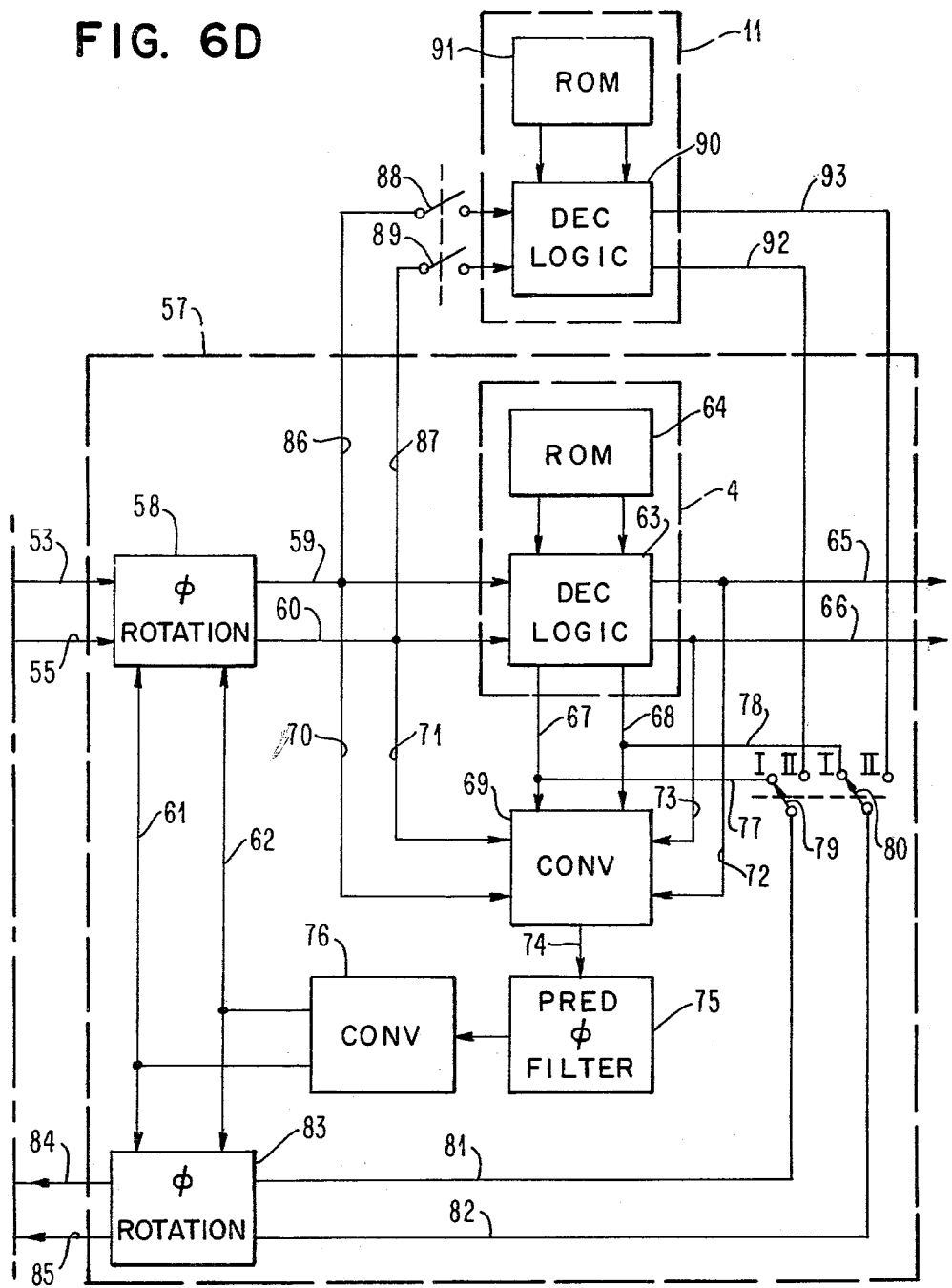

Still referring to FIG. 6D, the components $\Delta_b z_{i,n}'$ and $\Delta_b z_{q,n}'$ supplied by the auxiliary data detection device 11 are respectively inputted, via lines 92 and 93, switches 79 and 80, both of which are set to position II, and lines 81 and 82, to the phase rotation device 83, which adds the value of $\Delta\tilde{\phi}_n$ to the phase of the error signal $e_n'$. The signal thus obtained, which is the error signal $e_n$, is fed to the adjustment device 56. The phase rotation device 83 provides on lines 84 and 85, respectively, the components of the error signal $e_n$, written $e_{i,n}$ and $e_{q,n}$, that are fed to the device 56 which derives therefrom the control signals required to adjust the coefficients of the equalizer 2.

Figure 7:
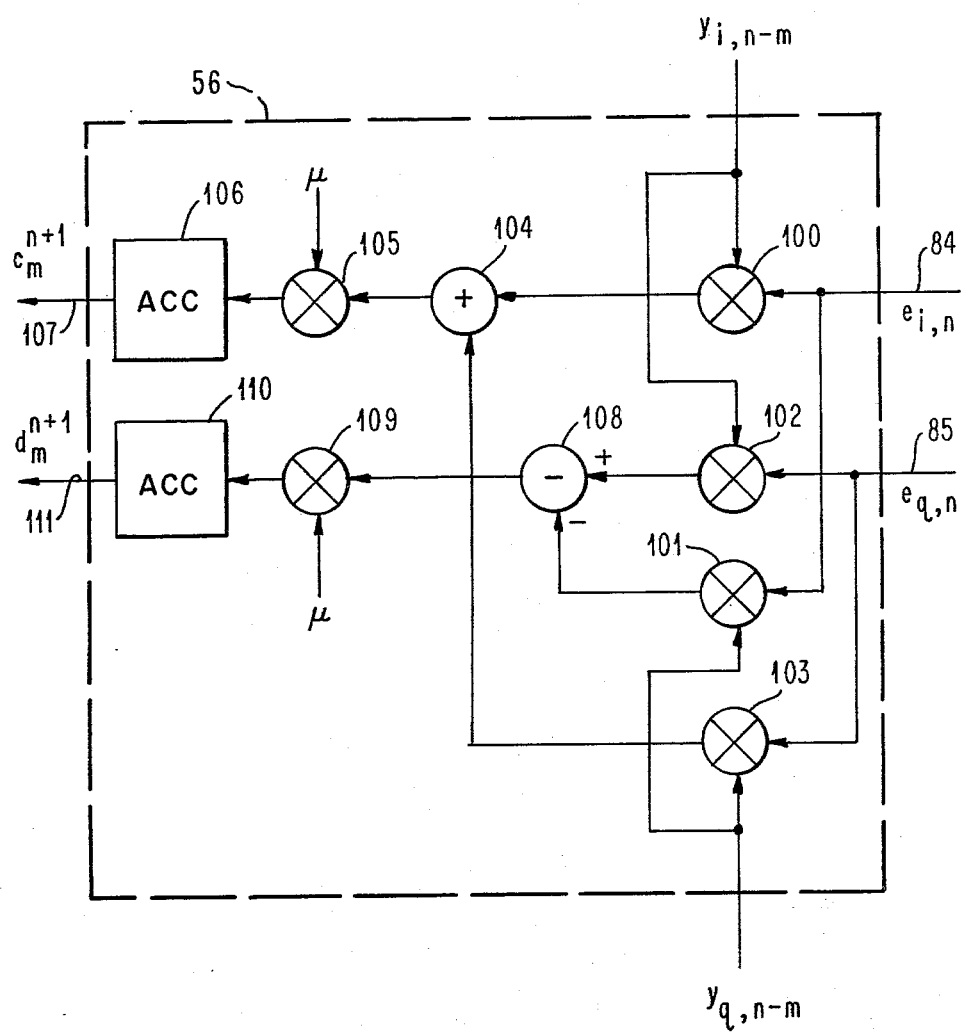
FIG. 7 is a detailed schematic diagram of the coefficient adjustment device 56 shown in block form in FIG. 6C.

A brief description of the device used to adjust the coefficients of the equalizer will now be given with reference to FIG. 7. The coefficients are adjusted in accordance with the well-known gradient method defined by relation (2), which is repeated below for convenience:

$$\underline{C}^{n+1} = \underline{C}^n - \mu e_n \underline{Y}_n^* \quad (2)$$

where
$\underline{C}^{n+1}$ is the vector of the values of coefficients $C_o, \ldots, C_m, \ldots, C_M$ of the equalizer at the $(n+1)^{th}$ iteration,
$\underline{C}^n$ is the vector of the values of $C_o, \ldots, C_M$ at the $n^{th}$ iteration,
$e_n$ is the error signal whose components, $e_{i,n}$ and $e_{q,n}$, are supplied, in the embodiment described by way of example, by the phase rotation device 83, and
$\underline{Y}_n$ is the vector of the signals stored in the equalizer at signaling instant nT, i.e., the vector of signals $y_n$, $y_{n-1}, \ldots, y_{n-m}, \ldots, y_M$.
The coefficients $C_m$ are complex coefficients $$C_m = c_m + jd_m \quad (19)$$

The error signal $e_n$ can be written as $$e_n = e_{i,n} + je_{q,n} \quad (20)$$

The signal $y_n$ is a complex signal $$y_n = y_{i,n} + jy_{q,n} \quad (21)$$

Considering relations (15), (20) and (21), we can obtain from relation (2)

$$c_m^{n+1} = c_m^n - \mu(e_{i,n}y_{i,n-m} + e_{q,n}y_{q,n-m}) \quad (22)$$

$$d_m^{n+1} = d_m^n - \mu(e_{q,n}y_{i,n-m} - e_{i,n}y_{q,n-m}) \quad (23)$$

for n=1, 2, ..., M.

The coefficient adjustment device 56 uses relations (22) and (23). For simplicity, only those circuits which are involved in the adjustment of coefficients $c_m$ and $d_m$ have been shown in FIG. 7.

The component $e_{i,n}$ supplied by the phase rotation device 83 is applied via line 84 to a first input of each of two multipliers 100 and 101. The second input of the multiplier 100 receives the component $y_{i,n-m}$ from the $n^{th}$ tap of the delay line 42. The product $e_{i,n}y_{i,n-m}$ is obtained at the output of the multiplier 100. The component $e_{q,n}$ supplied by the device 83 is applied via line 85 to a first input of each of two multipliers 102 and 103. The second input of the multiplier 103 receives the component $y_{q,n-m}$ from the $m^{th}$ tap of the delay line 43. The multiplier 103 supplies the product $e_{q,n}y_{q,n-m}$ which is added to the product $e_{i,n}y_{i,n-m}$ provided by the multiplier 100 in an adder 104. The output from the multiplier 104 is multiplied by the quantity $\mu$ in a multiplier 105 which supplies the control signal $$\mu(e_{i,n}y_{i,n-m} + e_{q,n}y_{q,n-m})$$

The latter is subtracted from the value $c_m^n$, stored in an accumulator 106, of the coefficient $c_m$. The accumulator 106 contains at this time the new value, $c_m^{n+1}$, of the coefficient $c_m$, which new value is fed to multipliers 441 and 461 via line 107.

The second input of the multiplier 102 receives the component $y_{i,n-m}$ while the second input of the multiplier 101 receives the component $y_{q,n-m}$. The output from the multiplier 101 is subtracted from the output from the multiplier 102 in a subtractor 108 whose output is multiplied by the quantity $\mu$ in a multiplier 109, which supplies the control signal $$\mu(e_{q,n}y_{i,n-m} - e_{i,n}y_{q,n-m})$$

The latter is subtracted from the value $d_m^n$, stored in an accumulator 110, of the coefficient $d_m$. The accumulator 110 contains at this time the new value $d_m^{n+1}$, of the coefficient $d_m$ and this new value is applied via line 111 to multipliers 451 and 471.

In FIG. 1, the output signal from the equalizer 2 is shown as being directly fed to the data detection device 4 and the auxiliary data detection device 11, whereas in FIG. 6 this signal is shown as being applied to devices 4 and 11 after the value $\Delta\phi_n$ has been subtracted from its phase. Those skilled in the art will readily understand that, in accordance with the present invention, it is essential that the same signal, designated input signal, be fed to both the data detection device and the auxiliary data detection device, and that said input signal may result from some processing of the output signal of the equalizer. The processing may consist, for example, in acting upon the phase of the output signal of the equalizer, as in the example illustrated in FIG. 6, or in performing a demodulation operation, as is done in some known receiver arrangements.

Those skilled in the art will also understand that the error signal supplied by the auxiliary data detection device can be applied to the coefficient adjustment device 56, either directly or indirectly, depending upon the receiver arrangement being used.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. In a data receiver for a data transmission system using a QAM technique, of the type wherein the received signal is, in particular, equalized by an adaptive equalizer and then fed as an input signal to a data detection device which supplies the detected data after comparing said input signal with a first constellation, a method of training said equalizer, characterized in that it includes the steps of:
   a. comparing said input signal with a second constellation comprising fewer points than said first constellation;
   b. selecting that point of said second constellation which is nearest the point representative of said input signal;
   c. determining an error signal which is a function of the distance between the point representative of said input signal and the point of said second constellation selected during step b.; and
   d. deriving from said error signal control signals serving to adjust the coefficients of the equalizer.

2. Method according to claim 1, characterized in that said second constellation is comprised of those points of said first constellation which are farthest from its center.

3. Method according to claim 2, characterized in that the coefficients of the equalizer are not adjusted where the point representative of said input signal is located within an area that includes all of those points of said first constellation which do not belong to said second constellation.

4. Method according to claim 1, characterized in that said second constellation is derived from said first constellation:
   by dividing said first constellation into L sets of point $S^l$, l=1, ..., L, and
   by associating with each set $S^l$ one point $b^l$ of said second constellation defined as $$b^l = \frac{\sum_{k \in S^l} |a^k|^2}{\left(\sum_{k \in S^l} a^k\right)^*}, l = 1, \ldots, L$$

where points $a^k$ are those points of said first constellation which belong to set $S^l$.

5. In a data receiver for a data transmission system using a QAM technique, of the type that includes an adaptive equalizer and a data detection device which receives as input signal the received signal after the latter has been, in particular, equalized, and provides the detected data after comparing said input signal with a first constellation, a device for training the equalizer, characterized in that it includes:
   an auxiliary data detection device wherein said input signal is compared with a second constellation comprising fewer points than said first constellation and which selects that point of said second constellation which is nearest the point representative of said input signal and generates an error signal that is dependent upon the distance between said point representative of said input signal and the selected point of said second constellation, and means for deriving from said error signal control signals for adjusting the coefficients of the equalizer.

6. In a data receiver for a data transmission system using a QAM technique, of the type that includes an adaptive equalizer, means for subtracting an estimated phase error from the phase of the equalized signal and for supplying a signal called input signal, a data detection device which receives said input signal as input and supplies the detected data after comparing said input signal with a first constellation, and means for supplying said estimated phase error, a device for training the equalizer, characterized in that it includes:

an auxiliary data detection device wherein said input signal is compared with a second constellation comprising fewer points than said first constellation, and which selects that point of said second constellation which is nearest the point representative of said input signal and generates an error signal that is dependent upon the distance between the point representative of said input signal and the selected point of said second constellation, means for adding said estimated phase error to the phase of said error signal, and means for deriving from the signal supplied by the latter means control signals for adjusting the coefficients of the equalizer.

7. Device according to claim 5 or 6, characterized in that said second constellation is comprised of those points of said first constellation which are farthest from its center.

8. Device according to claim 7, characterized in that the coefficients of the equalizer are not adjusted where the point representative of said input signal is located within an area which includes all of those points of said first constellation which do not belong to said second constellation.

9. Device according to claim 5 or 6, characterized in that said second constellation is derived from said first constellation:

by dividing said first constellation into L sets of points $S^l$, $l=1, \ldots, L$, and by associating with each set $S^l$ one point $b^l$ of said second constellation defined as $$b^l = \frac{\sum\limits_{k \in S^l} |a^k|^2}{\left(\sum\limits_{k \in S^l} a^k\right)^*}, l = 1, \ldots, L$$

where points $a^k$ are those points of said first constellation which belong to set $S^l$.

10. Device according to claim 6, characterized in that said input signal is simultaneously applied to said data detection device and to said auxiliary data detection device so that said data detection device will control said means for supplying said estimated phase error while said auxiliary data detection device will control the adjustment of the coefficient of the equalizer.

* * * * *